(12) United States Patent
Taguchi et al.

(10) Patent No.: US 9,789,833 B2
(45) Date of Patent: Oct. 17, 2017

(54) VEHICLE FRAME STRUCTURE

(71) Applicant: TOYOTA JIDOSHA KABUSHIKI KAISHA, Toyota-shi (JP)

(72) Inventors: Kosuke Taguchi, Okazaki (JP); Chitoshi Sugano, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/236,100

(22) Filed: Aug. 12, 2016

(65) Prior Publication Data

US 2017/0050598 A1 Feb. 23, 2017

(30) Foreign Application Priority Data

Aug. 21, 2015 (JP) .................................. 2015-164084

(51) Int. Cl.
*B60R 19/34* (2006.01)
*B62D 21/15* (2006.01)
*B62D 25/08* (2006.01)
*B60R 19/42* (2006.01)

(52) U.S. Cl.
CPC .............. *B60R 19/34* (2013.01); *B60R 19/42* (2013.01); *B62D 21/152* (2013.01); *B62D 25/082* (2013.01)

(58) Field of Classification Search
CPC ..... B60R 19/34; B60R 21/152; B60R 25/082; B60R 19/42
See application file for complete search history.

(56) References Cited

U.S. PATENT DOCUMENTS

| 2012/0248819 | A1 | 10/2012 | Okamura et al. | |
| 2014/0361559 | A1* | 12/2014 | Sakakibara | B60R 19/34 |
| | | | | 293/133 |
| 2016/0167712 | A1* | 6/2016 | Ogawa | B60R 19/24 |
| | | | | 296/187.1 |
| 2016/0207573 | A1* | 7/2016 | Kitakata | B62D 21/152 |
| 2017/0021868 | A1* | 1/2017 | Watanabe | B62D 21/152 |

FOREIGN PATENT DOCUMENTS

| JP | 2001-233240 A | 8/2001 |
| JP | 2010-070038 A | 4/2010 |
| JP | 2011-143793 A | 7/2011 |
| JP | 2013-014289 A | 1/2013 |
| JP | 2013-212757 A | 10/2013 |

* cited by examiner

*Primary Examiner* — Faye M Fleming
(74) *Attorney, Agent, or Firm* — Oblon, McClelland, Maier & Neustadt, L.L.P.

(57) ABSTRACT

A vehicle frame structure includes a bumper reinforcement, a side structure that includes a first side wall on an outer side of the side structure in a vehicle width direction and a first protruding structure, and a crush box that is arranged between the bumper reinforcement and the side structure and includes a second side wall on an outer side of the crush box in the vehicle width direction, the second side wall having a second protruding structure. An edge line of the first protruding structure and an edge line of the second protruding structure are provided to be continuous in a vehicle front-rear direction, and a width in a vehicle up and down direction of the first protruding structure becomes wider farther away from the second protruding structure, in the vehicle front-rear direction.

8 Claims, 8 Drawing Sheets

VEHICLE FRAME STRUCTURE

CROSS-REFERENCE TO RELATED APPLICATIONS

This application is based upon and claims the benefit of priority from Japanese Patent Application No. 2015-164084, filed on Aug. 21, 2015, the entire contents of which are incorporated herein by reference in entirety.

BACKGROUND OF THE DISCLOSURE

1. Field of the Disclosure

This application relates to a vehicle frame structure.

2. Description of Related Art

Japanese Patent Application Publication No. 2013-014289 (JP 2013-014289 A) described below describes technology relating to a front vehicle body structure of a vehicle. In brief, with this related art, a protruding portion that protrudes toward an outside of the vehicle in a vehicle width direction is formed on both an outer side surface of a crush box and an outer side surface of a side frame. This protruding portion has a U-shaped sectional shape that is open on an inner side in a vehicle width direction. An edge line of the protruding portion on the crush box side and an edge line of the protruding portion on the side frame side are arranged continuous in the vehicle front-rear direction via a plate. Furthermore, in this related art, a rectangular opening is formed in the protruding portion of the side frame, in a position of near the vehicle rear side in order to control the initial (first stage) breaking position of the side frame.

However, with the related art, the edge line of the protruding portion formed on the outer side of the side frame terminates on a middle of the side frame in a height direction of the outer side surface of the side frame, so the breaking position of the side frame will not be stable when a collision occurs. Therefore, in the related art described above, although the initial (first stage) breaking position of the side frame is specified by forming a weak portion on the vehicle rear side of the protruding portion on the side frame side. On the flip side, the side frame will probably not easily bend efficiently at the initial (first stage) breaking position by only providing the protruding portion on the side frame side.

SUMMARY

The disclosure provides a vehicle frame structure that enables a side structure to bend toward the inner side of the vehicle in the vehicle width direction at a predetermined breaking position when a collision occurs, in a structure in which a protruding structure that protrudes from an outer side surface of a crush box outward in the vehicle width direction is provided.

One aspect of the disclosure relates to a vehicle frame structure provides a vehicle frame structure. The aspect includes: a bumper reinforcement that is arranged on an end of a vehicle body in a vehicle front-rear direction and extends in a vehicle width direction; a side structure that extends from an end of the bumper reinforcement in the vehicle width direction toward a center of the vehicle body in the vehicle front-rear direction, the side structure having a closed cross-sectional structure, and including a first side wall, the first side wall being provided on an outer side of the side structure in the vehicle width direction and having an upper edge line that extends in the vehicle front-rear direction, a lower edge line that extends in the vehicle front-rear direction, and a first protruding structure that protrudes outward in the vehicle width direction from the first side wall and extends in the vehicle front-rear direction; and a crush box that is arranged between the bumper reinforcement and the side structure, the crush box being deformable by a collision input equal to or greater than a predetermined value from the bumper reinforcement, the crush box including a second side wall that is positioned on an outer side of the crush box in the vehicle width direction, the second side wall having a second protruding structure that protrudes outward in the vehicle width direction from the second side wall and extends in the vehicle front-rear direction, the second protruding structure being provided on a middle structure, in a height direction, of the second side wall. An edge line of the first protruding structure and an edge line of the second protruding structure are provided to be substantially continuous with each other in the vehicle front-rear direction. A distance between the first protruding structure and the upper edge line at an end of the first protruding structure on the crush box side is greater than a distance between the first protruding structure and the upper edge line, at a position a predetermined first distance away from the end of the first protruding structure on the crush box side in a direction away from the crush box. A distance between the first protruding structure and the lower edge line at the end of the first protruding structure on the crush box side is greater than a distance between the first protruding structure and the lower edge line, at a position a predetermined second distance away from the end of the first protruding structure on the crush box side in a direction away from the crush box.

In the aspect, an end of the first protruding structure that is on an opposite side from the crush box may be connected to the upper edge line and the lower edge line.

In the above aspect, a width in a vehicle up and down direction of the first protruding structure may become wider farther away from the second protruding structure, in the vehicle front-rear direction.

In the above aspect, the crush box may have a closed cross-sectional structure, and is deformable in compressive deformation.

When a collision load is input to an end of the bumper reinforcement in the vehicle width direction, this collision load is transmitted to the side structure via the crush box. In this process, the crush box compressively plastically deforms, and a predetermined energy is absorbed.

The second protruding structure that protrudes from a side wall structure of the crush box outward in the vehicle width direction and extends in the vehicle front-rear direction is formed on a middle structure of the side wall structure of the crush box in the height direction. The side wall structure of the crush box is positioned on the outer side of the crush box in the vehicle width direction. Also, the first protruding structure that protrudes from the side wall structure of the side structure outward in the vehicle width direction on the crush box side and extends in the vehicle front-rear direction, is also formed on the side wall structure of the side structure. The side structure is connected to the crush box. The side wall structure of the side structure is positioned on the outer side of the side structure in the vehicle width direction. Also, the end portion on the side structure side of the second protruding structure and the end portion on the crush box side of the first protruding structure are arranged such that the edge lines thereof are substantially continuous with each other in the vehicle front-rear direction. Therefore, by forming the second protruding structure, not only will a larger collision load be transmitted to an outer side portion of the crush box in the vehicle width direction, but a collision load that is transmitted through the edge lines of the second protruding structure will be directly transmitted to the edge lines of the first protruding structure.

Also, in the aspect described above, the width of the first protruding structure in the vehicle up and down direction becomes wider farther away from the second protruding structure in the vehicle front-rear direction, and the end portion that is on the opposite side from the crush box is connected to the upper edge line and the lower edge line of the side structure. Therefore, a collision load transmitted from the edge lines of the second protruding structure to the edge lines of the first protruding structure will be directly transmitted to the upper edge line and the lower edge line of the side wall structure that is arranged on the outer side of the side structure in the vehicle width direction.

That is, a collision load that is transmitted through the edge lines of the second protruding structure of the crush box will be transmitted to the upper edge line and the lower edge line of the side structure through the edge lines of the first protruding structure. As a result of the collision load being transmitted in this way, the collision load is efficiently transmitted to the connecting portions where the edge lines of the first protruding structure are connected to the upper edge line and the lower edge line, so the side structure will break and deform toward the inner side of the vehicle in the vehicle width at the connecting positions.

Also, in the aspect described above, the edge lines of the first protruding structure are connected to the upper edge line and the lower edge line of the side structure. Therefore, it is not necessary to separately provide a weak portion formed by an opening or the like in the side structure, in order to make the side structure break and deform toward the inner side of the vehicle in the vehicle width direction.

As described above, with the vehicle frame structure according to this aspect of the disclosure, the side structure is able to efficiently bend toward the inner side of the vehicle in the vehicle width direction at an initial (first stage) breaking position of the side structure when a collision occurs, without providing a weak portion that will serve as a break starting point at this breaking position, in a structure in which a protruding structure that protrudes from the outer side surface of the crush box outward in the vehicle width direction is provided on the outer side surface of the crush box.

In the above aspect, the first side wall may include a recessed structure that is provided on a middle structure of the first protruding structure in a vehicle up and down direction. The recessed structure may be recessed toward an inner side of the vehicle in the vehicle width direction and may extend in the vehicle front-rear direction. A width in the vehicle up and down direction of the recessed structure may become narrower closer toward the crush box.

According to this aspect, the recessed structure that is recessed toward the inner side of the vehicle in the vehicle width direction and extends in the vehicle front-rear direction is formed on the middle structure, in the vehicle up and down direction, of the first protruding structure, so the strength and rigidity of the first protruding structure increase.

In the above aspect, the side structure may have an engine mount attaching structure at a predetermined position in the vehicle front-rear direction. The end of the first protruding structure that is on the opposite side from the crush box may be closer to the bumper reinforcement than the engine mount attaching structure is.

According to this aspect, the end portion of the first protruding structure that is on the opposite side from the crush box is arranged farther toward the bumper reinforcement side than the engine mount attaching structure. Therefore, the side structure will reliably break and deform toward the inner side of the vehicle in the vehicle width direction when a collision occurs. The engine mount attaching structure also serves as a type of reinforcing structure for the side structure, so the side structure will not easily break and deform toward the inner side of the vehicle in the vehicle width direction at the position where the engine mount attaching structure is arranged. Therefore, if the end portion of the first protruding structure that is on the opposite side from the crush box is set in the position where the engine mount attaching structure is arranged, the side structure will not easily break and deform toward the inner side of the vehicle in the vehicle width direction when a collision occurs. In contrast, when the end portion of the first protruding structure that is on the opposite side from the crush box is arranged farther toward the bumper reinforcement side than the engine mount attaching structure, as in this aspect, breaking and deforming of the side structure toward the inner side of the vehicle in the vehicle width direction when a collision occurs is able to be inhibited from being impeded by the engine mount attaching structure.

In the above aspect, the first protruding structure may be integrally formed the side structure.

According to this aspect, the first protruding structure is integrally formed with the side structure. In this aspect, a collision load is able to be transmitted more smoothly than it is when the first protruding structure is formed separately from the side structure. That is, if the first protruding structure were to be formed separately from the side structure, the edge lines of the first protruding structure would be offset from the upper edge line and the lower edge line of the side structure by an amount corresponding to the plate thickness of the first protruding structure. As a result, loss would occur in the transmission of a collision load. When the first protruding structure is integrally formed with the side structure, as in this aspect, the edge lines of the first protruding structure are not offset with respect to the edge lines of the side structure, so the side structure will more efficiently break and deform toward the inner side of the vehicle in the vehicle width direction.

In the above aspect, a connecting position of the first protruding structure to the upper edge line and a connecting position of the first protruding structure to the lower edge line may be arranged in different positions in the vehicle front-rear direction.

According to this aspect, the connecting position of the first protruding structure to the upper edge line and the connecting position of the first protruding structure to the lower edge line are arranged in different positions in the vehicle front-rear direction, so stress is inhibited from concentrating at the same spot in the vehicle front-rear direction on the side structure. Therefore, when a collision load when a low speed collision occurs is input to the bumper reinforcement, the side structure is inhibited from breaking and deforming toward the inner side of the vehicle in the vehicle width direction.

On the other hand, when a collision load when a high speed collision occurs is input to the bumper reinforcement, the side structure is able to efficiently break and deform toward the inner side of the vehicle in the vehicle width direction at the connecting positions of the end portion of the first protruding structure that is on the opposite side from the crush box.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF ILLUSTRATIVE EMBODIMENTS

Figure 1:
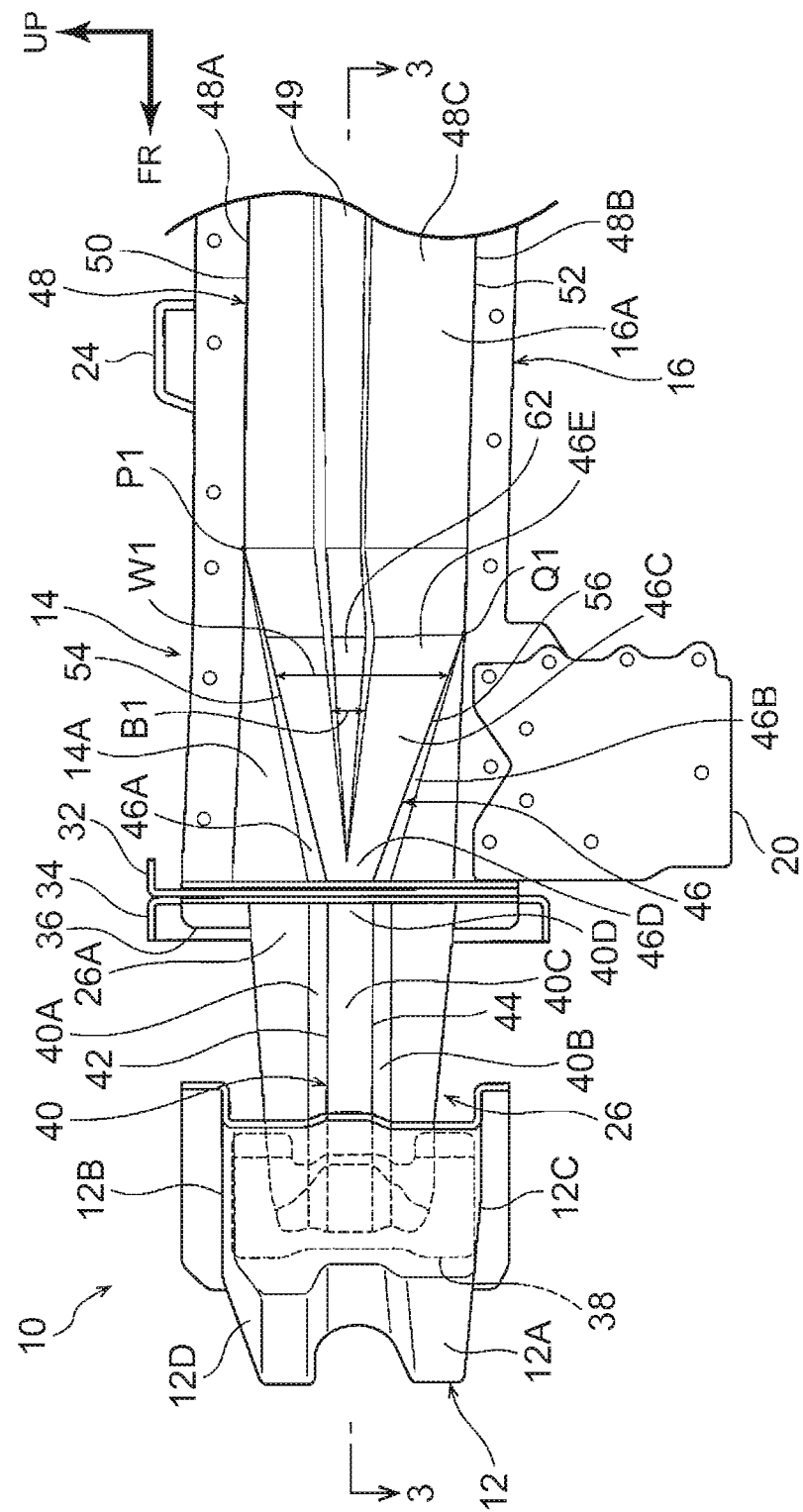
FIG. 1 is a side view of a vehicle frame structure according to a first example embodiment of the disclosure.

Hereinafter, a vehicle frame structure according to a first example embodiment of the disclosure will be described with reference to FIGS. 1 to 4. In the drawings, the arrow FR indicates a vehicle front side, and the arrow RR indicates a vehicle rear side. Also, the arrow UP indicates a vehicle upper side, and the arrow IN indicates the inside in a vehicle width direction. Also, although FIGS. 1 to 4 show a left front portion of a vehicle, the vehicle frame structure of the disclosure is a bilaterally symmetrical structure.

As shown in FIGS. 1 to 4, a front bumper reinforcement 12 that extends in the vehicle width direction is arranged on a front end portion of a vehicle body front portion 10 in a vehicle front-rear direction. This front bumper reinforcement 12 is an open cross-sectional structure. More specifically, the front bumper reinforcement 12 is formed in a general hat shape that is open on the vehicle rear side, and includes a front wall portion 12A that extends in the vehicle width direction and the vehicle up and down direction, and an upper wall portion 12B and a lower wall portion 12C that are bent toward the vehicle rear side from upper and lower end portions, respectively, of the front wall portion 12A.

Also, a pair of left and right front side members 14 are arranged one on each side of the vehicle body front portion 10 in the vehicle width direction. Each front side member 14 extends in the vehicle front-rear direction and has a closed cross-sectional structure. More specifically, the front side member 14 is formed having a generally rectangular closed cross-sectional structure by a generally flat plate-shaped outer front side member 16, and an inner front side member 18 that has a generally hat-shaped cross-section and is arranged on an inner side of the outer front side member 16 in the vehicle width direction. When the front side member 14 having this structure is viewed with reference to the front bumper reinforcement 12, the front side member 14 extends in the vehicle front-rear direction from an outer end of the front bumper reinforcement 12 in the vehicle width direction toward a center of the vehicle body in the vehicle front-rear direction.

A supplemental description of the surrounding structure of the front side member 14 will now be given. A suspension member attaching portion 20 is provided on a lower surface side of a front end portion 14A of the front side member 14. A front suspension member 22 (see FIG. 4) is supported by the front side member 14 via this suspension member attaching portion 20. Also, an engine mount attaching portion 24 is arranged on the inner side of the front side member 14 in the vehicle width direction, and in a position away from the vehicle rear side of the front end portion 14A of the front side member 14. The engine mount attaching portion 24 is provided in a total of four locations, one front and one rear on each of the left and right front side members 14.

A crush box 26 is interposed between the front bumper reinforcement 12 and the front side member 14 described above. This crush box 26 is formed having a closed cross-sectional structure in the vehicle front-rear direction. More specifically, this crush box 26 is formed by fitting an upper member 28 and a lower member 30 that are each formed in a generally semi-cylindrical shape together in the vehicle up and down direction, and then welding overlapping portions of these together. Also, the crush box 26 is formed in a generally cylindrical shape (a generally regular octagonal shape) viewed from the vehicle front side. Moreover, the crush box 26 is formed so as to compressively plastically deform in the axial direction by a compression load equal to or greater than a predetermined value being input in the axial direction. Therefore, when a collision load is input to the front bumper reinforcement 12 from the vehicle front, the crush box 26 will receive a reaction force from the front side member 14, and compress and plastically deform in the vehicle front-rear direction.

Two first connecting plates 32 and 34, each formed in a generally rectangular flat plate shape, are attached to a front end portion of the front side member 14 described above. Also, a second connecting plate 36 formed in a generally rectangular flat plate shape is attached to a rear end portion of the crush box 26. Further, a third connecting plate 38 that is formed in a generally rectangular shape is attached to a front end portion of the crush box 26. Then, the second connecting plate 36 is overlapped with the first connecting plates 32 and 34, and these are fastened together in this state by a nut and a bolt. Also, the front end portion of the crush box 26 is inserted into the cross-section of the front bumper reinforcement 12. Then, in a state overlapping with the front wall portion 12A of the front bumper reinforcement 12, the third connecting plate 38 is fastened to the front wall portion 12A by a nut and a bolt. As a result, an end portion 12D of the front bumper reinforcement 12 that is on the outer end of the front bumper reinforcement 12 in the vehicle width direction and the front end portion 14A of the front side member 14 are connected in the vehicle front-rear direction via the crush box 26.

Here, a second protruding portion 40 that protrudes from the outer side wall portion 6A of the crush box 26 outward in the vehicle width direction is integrally formed by press forming on a middle portion, in the height direction, of a side wall portion 26A. The side wall portion 26A is positioned on the outer side of the crush box 26 in the vehicle width direction. This second protruding portion 40 extends in the vehicle front-rear direction from a front end to a rear end of the crush box 26. Also, the second protruding portion 40 is formed in a general U-shape that is open to the inner side of the vehicle body in the vehicle width direction viewed from the vehicle front side, and is formed by three walls, i.e., an upper wall portion 40A, a lower wall portion 40B, and a side wall portion 40C. The upper wall portion 40A is formed as a downward sloping inclined wall that slopes downward toward the vehicle lower side from the side wall portion 26A outward in the vehicle width direction. On the other hand, the lower wall portion 40B is formed as an upward sloping inclined wall that slopes upward toward the vehicle upper side from the side wall portion 26A outward in the vehicle width direction. Also, a first 25 edge line 42 is formed extending in the vehicle front-rear direction on a connecting portion of the upper wall portion 40A and the side wall portion 40C, and a second edge line 44 is formed extending in the vehicle front-rear direction on a connecting portion of the side wall portion 40C and the lower wall portion 40B. The first edge line 42 and the second edge line 44 are arranged substantially parallel in the vehicle front-rear direction.

Figure 2:
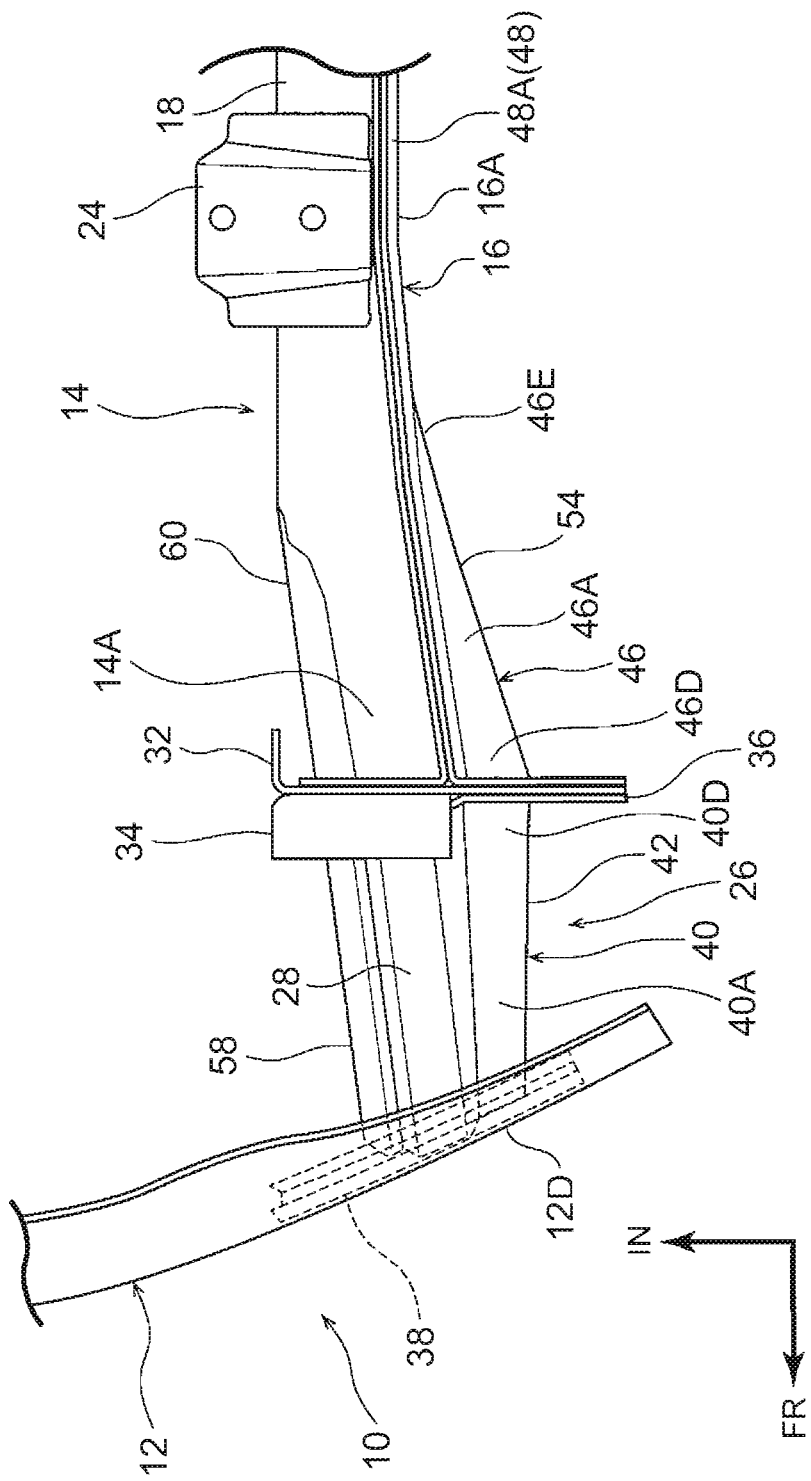
FIG. 2 is a plan view of the vehicle frame structure shown in FIG. 1.
Figure 3:
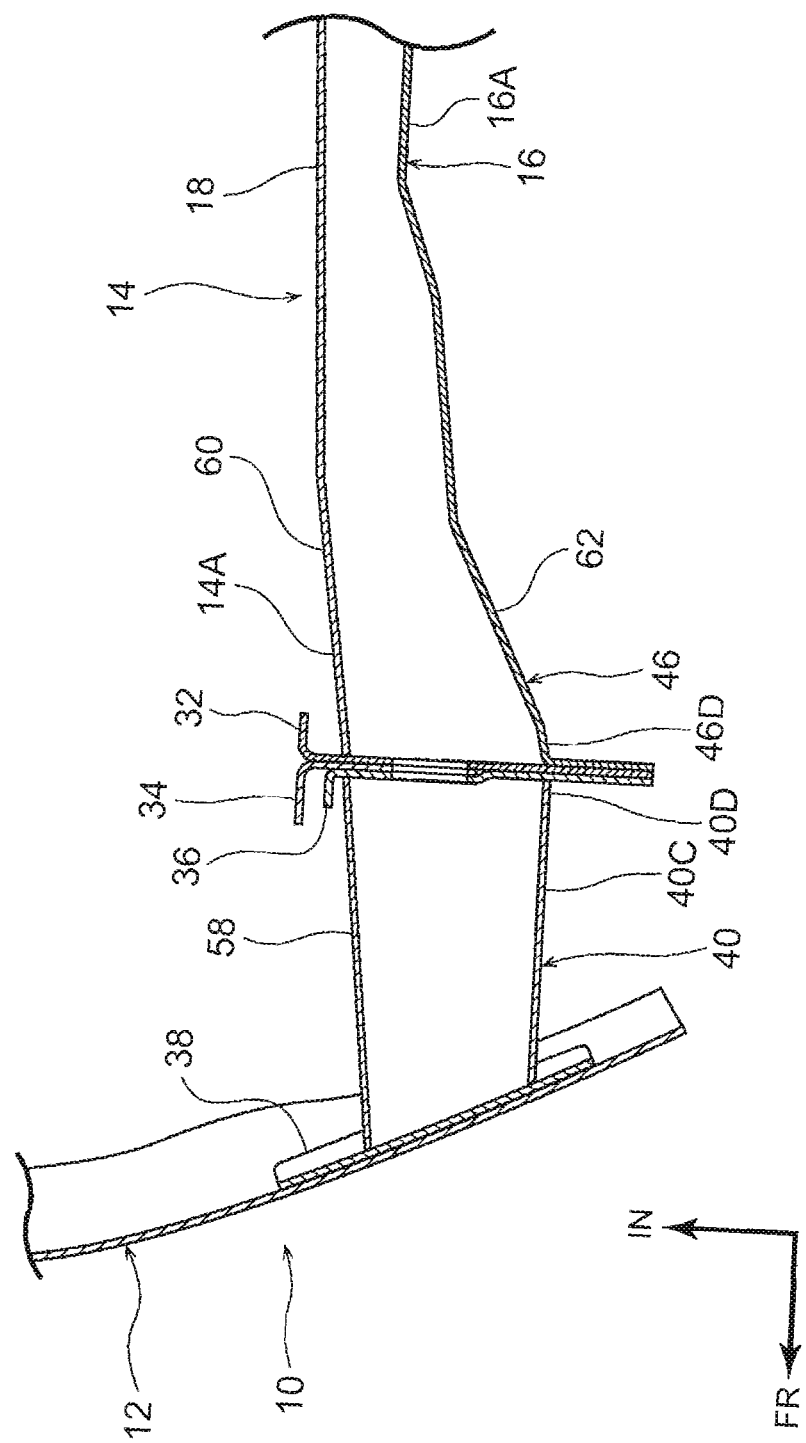
FIG. 3 is a top sectional view of a vehicle front structure shown in FIG. 1 shown cut along line 3-3.
Figure 4:
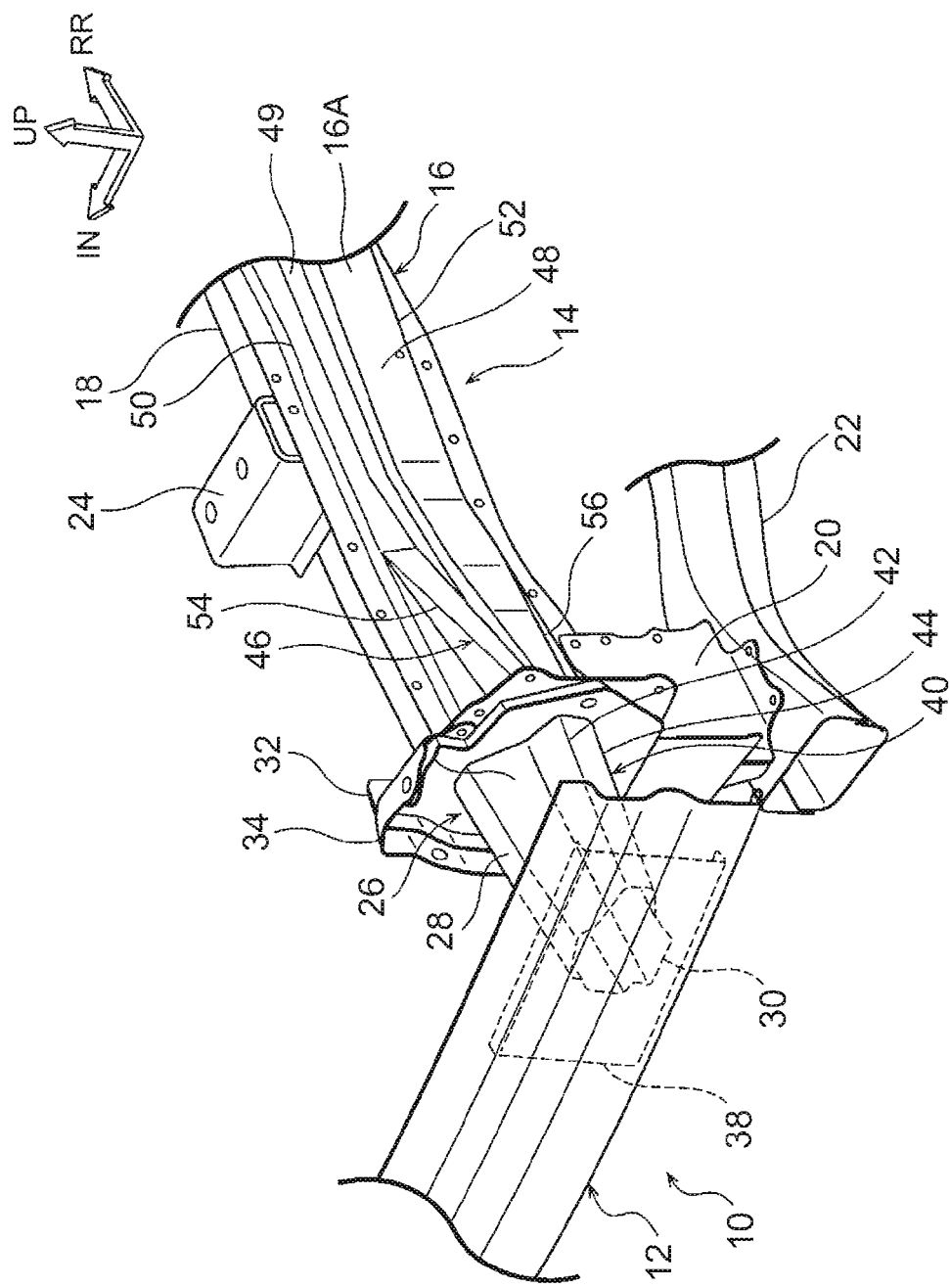
FIG. 4 is a perspective view of the assembled vehicle frame structure shown in FIG. 1 viewed from above at an angle.
Figure 5:
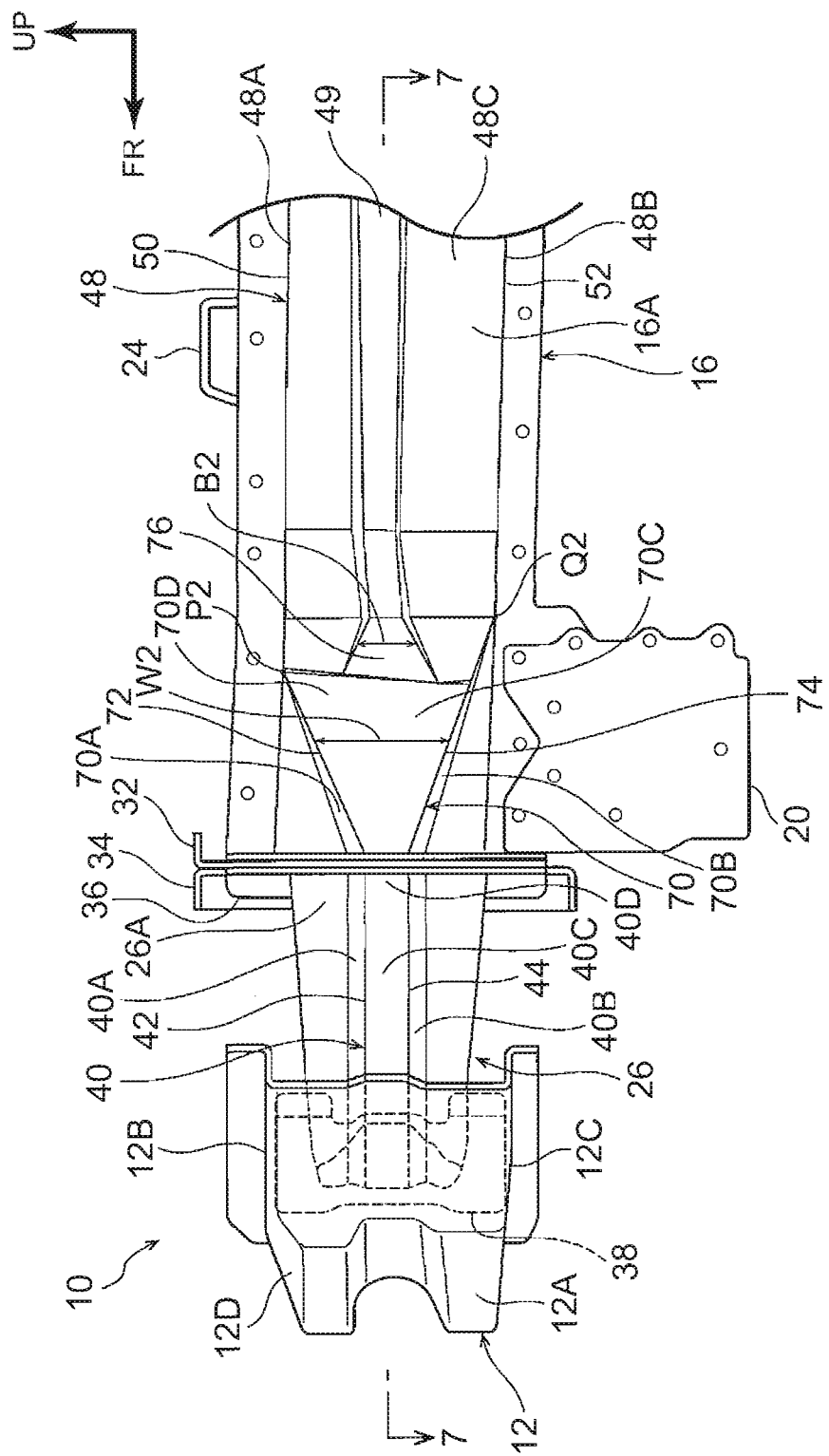
FIG. 5 is a side view of a vehicle frame structure according to a second example embodiment of the disclosure.
Figure 6:
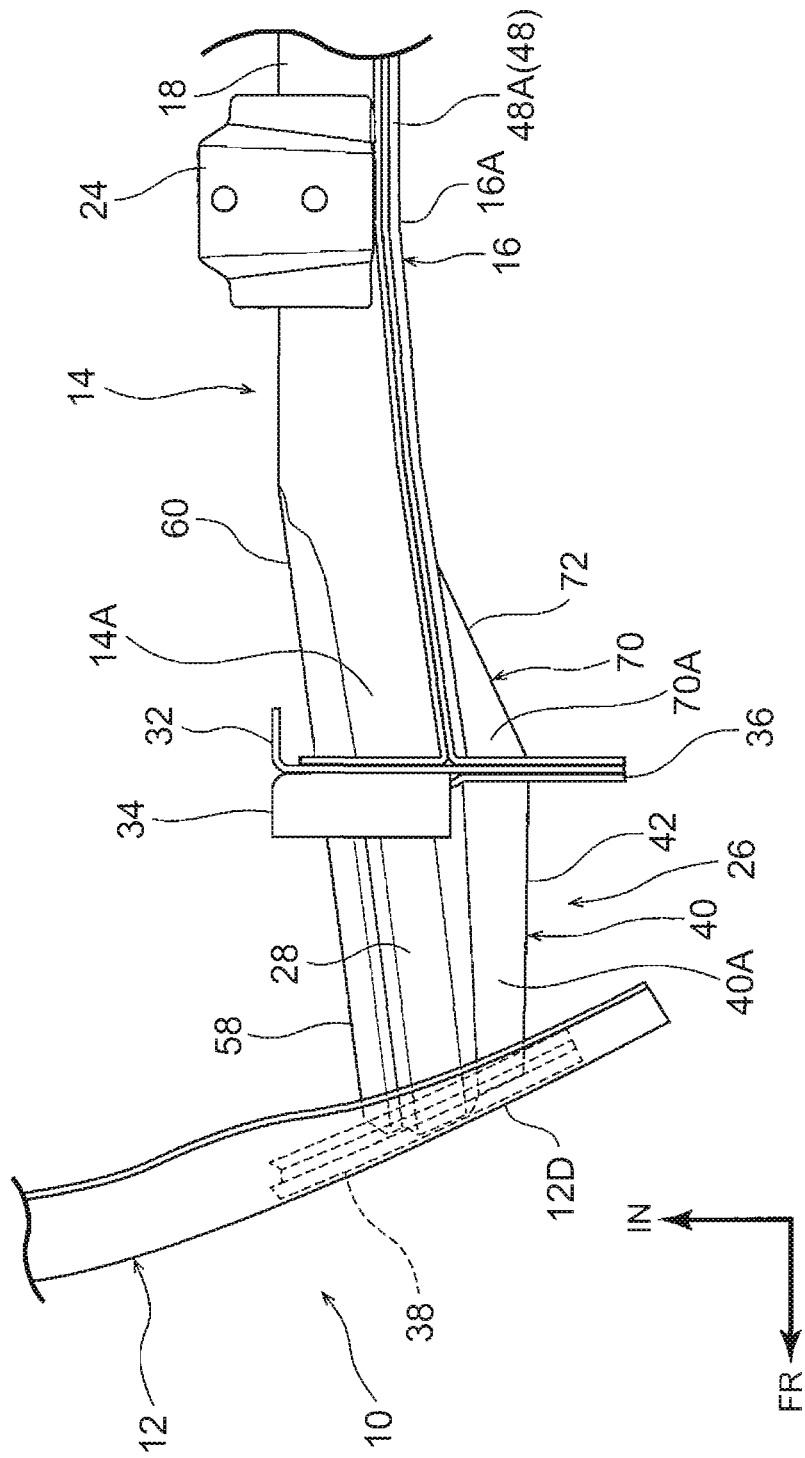
FIG. 6 is a plan view of the vehicle frame structure shown in FIG. 5.
Figure 7:
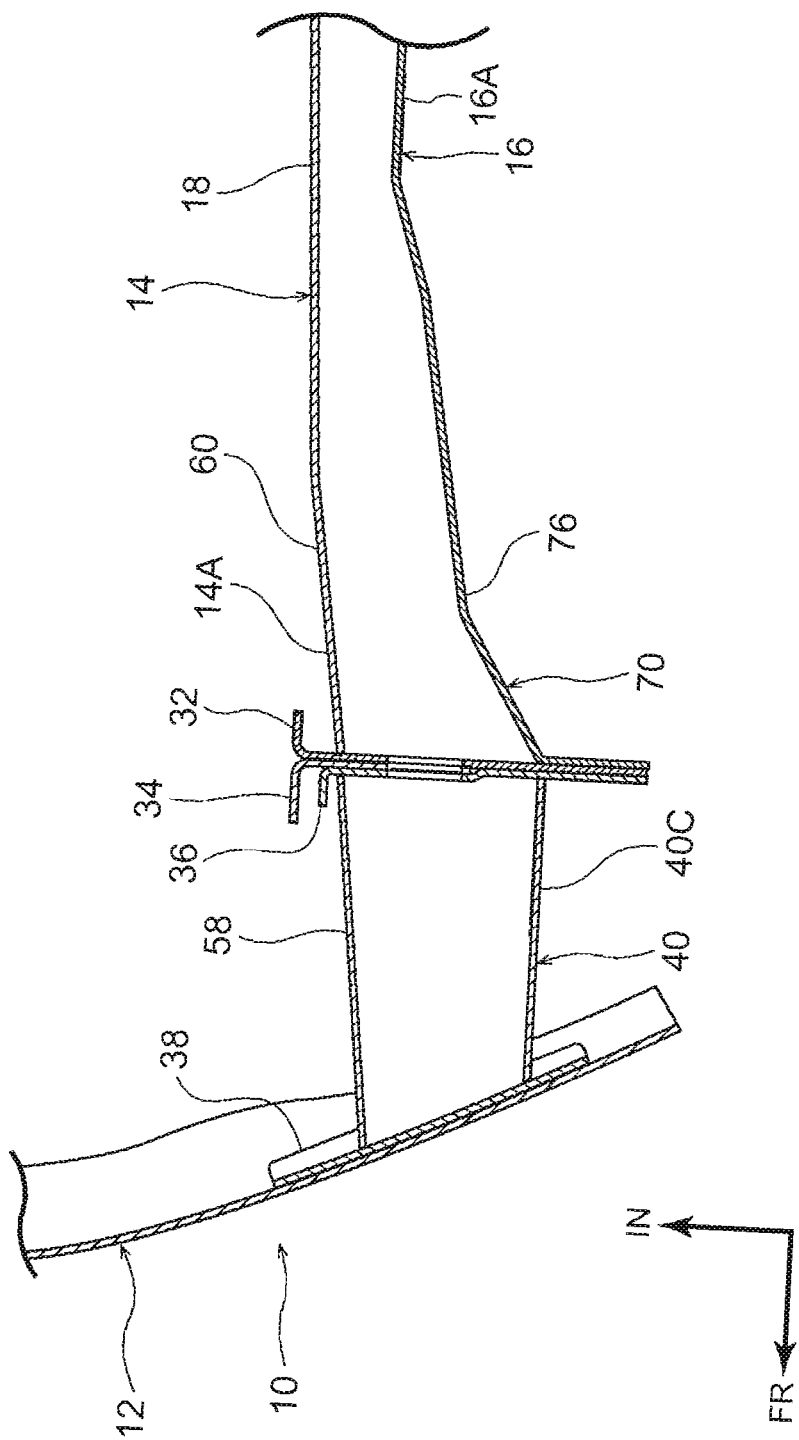
FIG. 7 is a top sectional view of a vehicle front structure shown in FIG. 5 shown cut along line 7-7.
Figure 8:
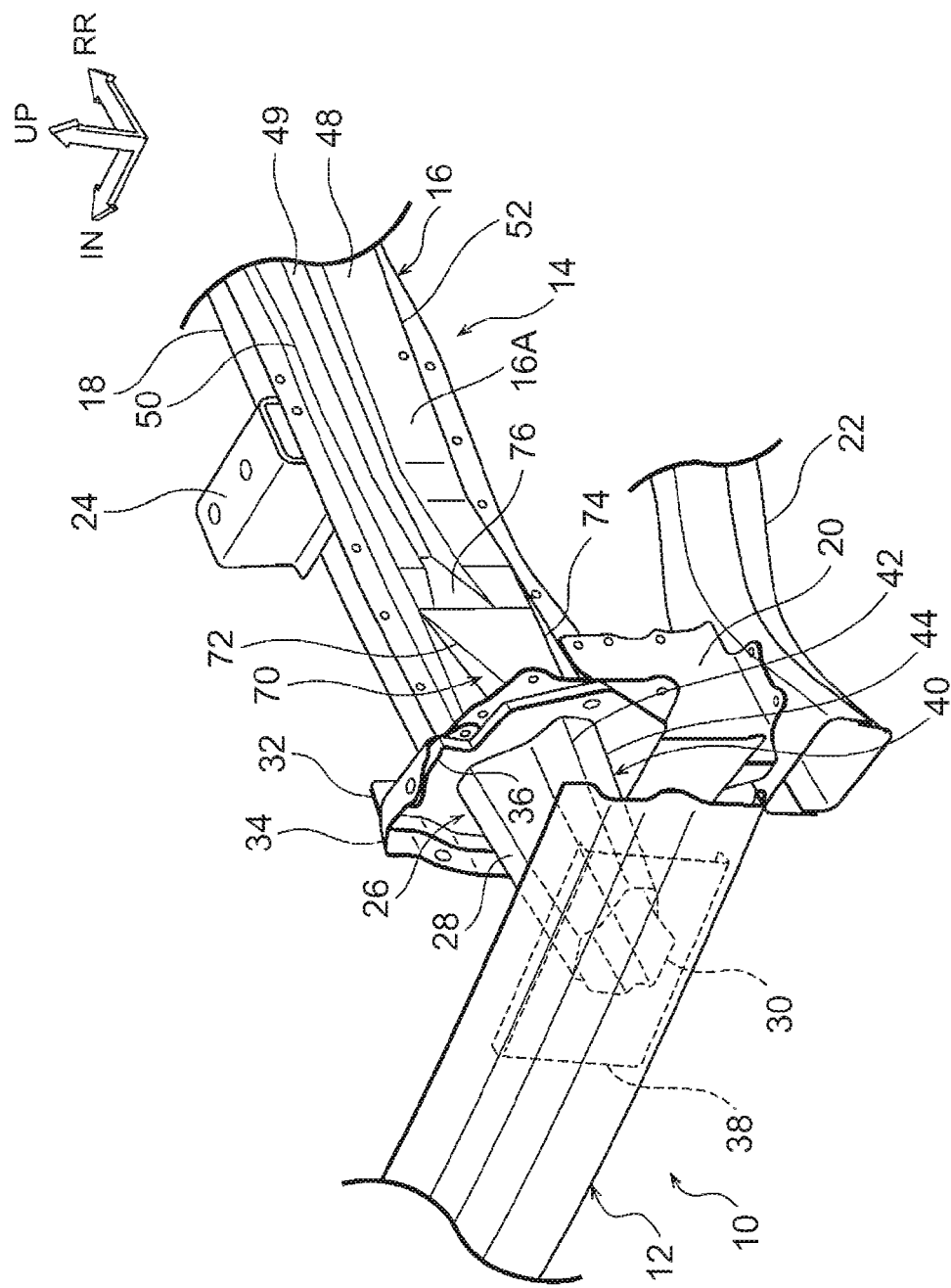
FIG. 8 is a perspective view of the assembled vehicle frame structure shown in FIG. 5 viewed from above at an angle.

Meanwhile, a first protruding portion 46 that protrudes from a side wall portion 16A of the outer front side member 16 outward in the vehicle width direction is integrally formed by press forming on the side wall portion 16A. The side wall portion 16A of the outer front side member 16 is positioned on outer side of the front side member 14 in the vehicle width direction. To be precise, a protruding portion 48 that protrudes slightly from the side wall portion 16A outward in the vehicle width direction is integrally formed on the side wall portion 16A of the outer front side member 16, as shown in FIGS. 2 and 4. The protruding portion 48 is set to a width dimension that is slightly narrower than the vertical width in the vehicle up and down direction of the side wall portion 16A of the outer front side member 16. Also, the protruding portion 48 is formed along the entire length in the length direction of the side wall portion 16A of the outer front side member 16. Moreover, a groove-shaped reinforcing bead 49 having a predetermined width that is recessed toward the inner side of the vehicle in the vehicle width direction is formed on a middle portion, in the vehicle up and down direction, of the protruding portion 48.

As shown in FIG. 1 and the like, the protruding portion 48 is formed by an upper wall portion 48A, a lower wall portion 48B, and a side wall portion 48C. An upper edge line 50 is formed extending in the vehicle front-rear direction on a connecting portion of the upper wall portion 48A and the side wall portion 48C. Similarly, a lower edge line 52 is formed extending in the vehicle front-rear direction on a connecting portion of the lower wall portion 48B and the side wall portion 48C.

The first protruding portion 46 that protrudes toward the outside of the vehicle body in the vehicle width direction is formed on the crush box 26 side (i.e., the vehicle front-rear direction front side, which is also the front end side) of the protruding portion 48 of the outer front side member 16 described above. This first protruding portion 46 is, on the whole, formed by three walls, i.e., an upper wall portion 46A, a lower wall portion 46B, and a side wall portion 46C, and is formed in a generally trapezoidal shape in a vehicle side view. Also, the side wall portion 46C of the first protruding portion 46 is such that a vertical width W1 (see FIG. 1) thereof in the vehicle up and down direction becomes wider farther away from the second protruding portion 40 toward the vehicle front-rear direction rear side.

The upper wall portion 46A and the lower wall portion 46B are formed in a right triangular-shape in a vehicle plan view (see FIG. 2). More specifically, a portion that is the bottom side of the right triangle is arranged on the protruding portion 48 side, a portion that is the height of the right triangular shape is arranged on the second protruding portion 40 side of the crush box 26, and a portion that is the hypotenuse of the right triangular shape is arranged on the outermost side in the vehicle width direction of the first protruding portion 46.

A third edge line 54 is formed extending in the vehicle front-rear direction on a connecting portion of the upper wall portion 46A and the side wall portion 46C described above, and a fourth edge line 56 is formed extending in the vehicle front-rear direction on a connecting portion of the side wall portion 46C and the lower wall portion 46B.

An end portion 40D on the front side member 14 side of the second protruding portion 40 described above and an end portion 46D on the crush box 26 side of the first protruding portion 46 are arranged such that the edge lines thereof (i.e., the first edge line 42 and the second edge line 44, and the third edge line 54 and the fourth edge line 56) thereof are substantially continuous with each other in the vehicle front-rear direction. That is, the first edge line 42 and the third edge line 54 are arranged continuous in the vehicle front-rear direction via the first connecting plates 32 and 34 and the second connecting plate 36, in a vehicle side view. Also, the second edge line 44 and the fourth edge line 56 are arranged continuous in the vehicle front-rear direction via the first connecting plates 32 and 34 and the second connecting plate 36, in a vehicle side view.

As shown in FIG. 2, in this example embodiment, not only the second protruding portion 40 and the first protruding portion 46, but also a first inside edge line 58 that is positioned on the innermost side in the vehicle width direction of the crush box 26, and an inclined second inside edge line 60 that is positioned on the innermost side in the vehicle width direction on the front end side of the front side member 14, are arranged continuous in the vehicle front-rear direction via the first connecting plates 32 and 34 and the second connecting plate 36.

Moreover, as shown in FIG. 1, an end portion 46E of the first protruding portion 46 that is on the opposite side from the crush box 26, is connected to the upper edge line 50 and the lower edge line 52 of the protruding portion 48. That is, a rear end of the third edge line 54 is connected to the upper edge line 50, and a rear end of the fourth edge line 56 is connected to the lower edge line 52. Also, the end portion 46E of the first protruding portion 46 that is on the opposite side from the crush box 26 is arranged farther toward the from bumper reinforcement 12 side (i.e., the vehicle front-rear direction front side) than the engine mount attaching portion 24. Further, a connecting position P1 of the first protruding portion 46 to the upper edge line 50 and a connecting position Q1 of the first protruding portion 46 to the lower edge line 52 are arranged in different positions in the vehicle front-rear direction. In this example embodiment, the third edge line 54 of the first protruding portion 46 is connected to the upper edge line 50 at a position (the connecting position P1) that is to the vehicle front side of the engine mount attaching portion 24 and near the engine mount attaching portion 24. Also, the fourth edge line 56 of the first protruding portion 46 is connected to the lower edge line 52 at a position (the connecting position Q1) that is to the vehicle rear side of the suspension member attaching portion 20 and adjacent to the suspension member attaching portion 20. Therefore, the connecting position P1 of the first protruding portion 46 to the upper edge line 50 is arranged farther to the vehicle rear side than the connecting position Q1 of the first protruding portion 46 to the lower edge line 52.

Also, a recessed portion 62 that is formed recessed toward the inner side of the vehicle in the vehicle width direction and having an isosceles triangle shape in a vehicle side view, is formed on a middle portion, in the vehicle up and down direction, of the side wall portion 46C that is positioned on the outer side of the first protruding portion 46 described above in the vehicle width direction. The recessed portion 62 is formed as a groove that extends in the vehicle front-rear direction, and is formed continuous as an extension of the reinforcing bead 49 described above that is formed on the protruding portion 48. Also, a vertical width B1 in the vehicle up and down direction of the recessed portion 62 is set narrower closer to the crush box 26. Furthermore, the recessed portion 62 does not extend to the front end of the side wall portion 46C of the first protruding portion 46, but terminates at a position a predetermined distance away from, to the vehicle rear side of, the front end of the side wall portion 46C.

Hereinafter, the operation and effects of this example embodiment will be described. When a collision load of a frontal collision, e.g., a small overlap collision, from the vehicle front side is input to an end portion 12D side on the outer end of the front bumper reinforcement 12 in the vehicle width direction, this collision load is transmitted to the front side member 14 via the crush box 26. In this process, the crush box 26 compressively plastically deforms, and a predetermined energy is absorbed.

Here, in this example embodiment, the second protruding portion 40 that protrudes from the outer side wall portion 26A of the crush box 26 outward in the vehicle width direction and extends in the vehicle front-rear direction, is formed on a middle portion, in the height direction, of the side wall portion 26A that is positioned on the outer side of the crush box 26 in vehicle width direction. Also, the first protruding portion 46 that protrudes from the side wall portion 16A outward in the vehicle width direction on the crush box 26 side and extends in the vehicle front-rear direction, is also formed on the side wall portion 16A that is positioned on the outer side of the front side member 14 in the vehicle width direction. The front side member 14 is connected to the crush box 26. Also, the end portion 40D on the front side member 14 side of the second protruding portion 40 and the end portion 46D on the crush box 26 side of the first protruding portion 46 are arranged such that the edge lines thereof (i.e., the first edge line 42 and the second edge line 44, and the third edge line 54 and the fourth edge line 56) are substantially continuous with each other in the vehicle front-rear direction. Therefore, by forming the second protruding portion 40, not only will a larger collision load be transmitted to an outer side portion of the crush box 26 in the vehicle width direction, but a collision load that is transmitted through the first edge line 42 and the second edge line 44 of the second protruding portion 40 will be directly transmitted to the third edge line 54 and the fourth edge line 56 of the first protruding portion 46.

Also, in this example embodiment, the vertical width W1 in the vehicle up and down direction of the first protruding portion 46 becomes wider farther away from the second protruding portion 40 in the vehicle front-rear direction, and the end portion 46E that is on the opposite side from the crush box 26 is connected to the upper edge line 50 and the lower edge line 52 of the front side member 14. Therefore, a collision load transmitted from the first edge line 42 and the second edge line 44 of the second protruding portion 40 to the third edge line 54 and the fourth edge line 56 of the first protruding portion 46 will be directly transmitted to the upper edge line 50 and the lower edge line 52 of the side wall portion 16A that is arranged on the outer side of the front side member 14 in the vehicle width direction.

That is, a collision load that is transmitted through the first edge line 42 and the second edge line 44 of the second protruding portion 40 of the crush box 26 will be transmitted with almost no loss to the upper edge line 50 and the lower edge line 52 of the front side member 14 through the third edge line 54 and the fourth edge line 56 of the first protruding portion 46. As a result of the collision load being transmitted in this way, the collision load is efficiently transmitted to the connecting portions where the third edge line 54 and the fourth edge line 56 of the first protruding portion 46 are connected to the upper edge line 50 and the lower edge line 52, respectively, so the front side member 14 will break and deform (bend) toward the inner side of the vehicle in the vehicle width direction at the connecting positions P1 and Q1.

Also, in this example embodiment, the third edge line 54 and the fourth edge line 56 of the first protruding portion 46 are connected to the upper edge line 50 and the lower edge line 52 of the front side member 14. Therefore, it is not necessary to separately provide a weak portion formed by an opening or the like in the front side member, in order to make the front side member break and deform toward the inner side of the vehicle in the vehicle width direction.

As a result, with the vehicle frame structure according to this example embodiment, the front side member 14 is able to efficiently bend toward the inner side of the vehicle in the vehicle width direction at an initial (first stage) breaking position of the front side member 14 when a collision occurs, without providing a weak portion that will serve as a break starting point at the initial (first stage) breaking position of the front side member 14, in a structure in which the second protruding portion 40 that protrudes from the outer side wall portion 26A of the crush box 26 outward in the vehicle width direction is formed on an outside surface of the crush box 26. To elaborate, in this example embodiment, the front side member 14 is made to break and deform in a general Z-shape in a vehicle plan view. Therefore, a weak portion is provided as a second stage break starting point in a middle portion in the vehicle front-rear direction of the front side member 14, but this weak portion differs from a weak portion that serves as the initial (first stage) break starting point, and thus may be provided without any problem. In other words, "without providing a weak portion that will serve as an initial (first stage) break starting point on the front side member 14" means without providing a weak portion to specify the break starting point, near a position where a load is input from a load transmitting portion (the first protruding portion or a gusset or spacer or the like corresponding to the first protruding portion) formed in a general triangular shape or the like in a vehicle plan view toward a side wall portion on the outer side of the front side member in vehicle width direction, in a structure in which outside portions in the vehicle width direction of the crush box and the front side member are connected together by the load transmitting portion.

Also, in this example embodiment, the recessed portion 62 that is recessed toward the inner side of the vehicle in the vehicle width direction and extends in the vehicle front-rear direction is formed on the middle portion, in the vehicle up and down direction, of the first protruding portion 46, so the strength and rigidity of the first protruding portion 46 increase. As a result, with this example embodiment, the front side member 14 is able to be made to effectively break and deform toward the inner side of the vehicle in the vehicle width direction when a collision occurs.

Furthermore, in this example embodiment, the end portion 46E of the first protruding portion 46 that is on the opposite side from the crush box 26 is arranged farther toward the front bumper reinforcement 12 side than the engine mount attaching portion 24, so the front side member 14 will reliably break and deform toward the inner side of the vehicle in the vehicle width direction when a collision occurs. That is, the engine mount attaching portion 24 also serves as a type of reinforcing member for the front side member 14, so the front side member 14 will not easily break and deform toward the inner side of the vehicle in the vehicle width direction at the position where the engine mount attaching portion 24 is arranged. Therefore, if the end portion 46E of the first protruding portion 46 that is on the opposite side from the crush box 26 is set in the position where the engine mount attaching portion 24 is arranged, the front side member 14 will not easily break and deform toward the inner side of the vehicle in the vehicle width direction when a collision occurs. In contrast, when the end portion 46E of the first protruding portion 46 that is on the opposite side from the crush box 26 is arranged farther toward the front bumper reinforcement 12 side than the engine mount attaching portion 24, as in this example embodiment, breaking and deforming of the front side member 14 toward the inner side of the vehicle in the vehicle width direction when a collision occurs is able to be inhibited from being impeded by the engine mount attaching portion 24. As a result, with this example embodiment, the front side member 14 is able to smoothly break and deform toward the inner side of the vehicle in the vehicle width direction when a collision occurs.

Also, in this example embodiment, the first protruding portion 46 is integrally formed with the front side member 14, so a collision load is able to be transmitted more smoothly than it is when the first protruding portion 46 is formed separately from the front side member 14. That is, if the first protruding portion were to be formed separately from the front side member, the edge lines (i.e., the third edge line and the fourth edge line) of the first protruding portion would be offset from the upper edge line and the lower edge line of the front side member by an amount corresponding to the plate thickness of the first protruding portion, and a corresponding amount of loss would occur in the transmission of a collision load. In contrast, when the first protruding portion 46 is integrally formed with the front side member 14, as in this example embodiment, the third edge line 54 and the fourth edge line 56 of the first protruding portion 46 are not offset with respect to the upper edge line 50 and the lower edge line 52 of the from side member 14, so the front side member 14 will more efficiently break and deform toward the inner side of the vehicle in the vehicle width direction. As a result, with this example embodiment, the front side member 14 is able to be made to quickly break and deform at the connecting positions P1 and Q1 of the third edge line 54 and the fourth edge line 56 of the first protruding portion 46 when a collision occurs.

Moreover, in this example embodiment, the connecting position P1 of the first protruding portion 46 to the upper edge line 50 and the connecting position Q1 of the first protruding portion 46 to the lower edge line 52 are arranged in different positions in the vehicle front-rear direction, so stress is inhibited from concentrating at the same spot in the vehicle front-rear direction on the front side member 14. Therefore, when a collision load when a low speed collision occurs is input to the front bumper reinforcement 12, the front side member 14 is inhibited from breaking and deforming toward the inner side of the vehicle in the vehicle width direction. On the other hand, when a collision load when a high speed collision occurs is input to the front bumper reinforcement 12, the front side member 14 is able to efficiently break and deform toward the inner side of the vehicle in the vehicle width direction at the connecting positions of the end portion 46E of the first protruding portion 46 that is on the opposite side from the crush box 26. As a result, with this example embodiment, damageability when a low speed collision occurs is able to be improved, while the front side member 14 is able to efficiently break and deform toward the inner side of the vehicle in the vehicle width direction when a high speed collision occurs.

Next, a vehicle frame structure according to a second example embodiment of the disclosure will be described with reference to FIGS. 5 to 8. Component parts in this second example embodiment that are the same as those in the first example embodiment described above will be denoted by like reference characters, and descriptions of these component parts will be omitted.

As shown in FIGS. 5 to 8, in this second example embodiment as well, a first protruding portion 70 is, on the whole, formed by three walls, i.e., an upper wall portion 70A, a lower wall portion 70B, and a side wall portion 70C, and is formed in a generally trapezoidal shape in a vehicle side view. Also, the side wall portion 70C of the first protruding portion 70 is such that a vertical width W2 (see FIG. 5) thereof in the vehicle up and down direction becomes wider farther away from the second protruding portion 40 toward the vehicle front-rear direction rear side.

Also, in this second example embodiment as well, a connecting position P2 of the first protruding portion 70 to the upper edge line 50 and a connecting position Q2 of the first protruding portion 70 to the lower edge line 52 are arranged in different positions in the vehicle front-rear direction. However, in this example embodiment, a third edge line 72 of the first protruding portion 70 is connected to the upper edge line 50 at a position (the connecting position P2) that is to the vehicle front side of the engine mount attaching portion 24 and away from the engine mount attaching portion 24. Also, a fourth edge line 74 of the first protruding portion 70 is connected to the lower edge line 52 at a position (the connecting position Q2) that is to the vehicle rear side of the suspension member attaching portion 20 and adjacent to the suspension member attaching portion 20. Therefore, the connecting position P2 of the first protruding portion 70 to the upper edge line 50 is arranged farther to the vehicle front side than the connecting position Q2 of the first protruding portion 70 to the lower edge line 52.

In the first example embodiment described above, the recessed portion 62 that is close to the front-rear length of the first protruding portion 46 is formed on the middle portion, in the height direction, of the first protruding portion 46, but with the first protruding portion 70 in this second example embodiment, the front-rear length of the first protruding portion 70 is shorter than the front-rear length of the first protruding portion 46, so a different recessed portion 76 is formed. That is, this recessed portion 76 resembles the recessed portion 62 in the first example embodiment in that it is formed as an extension of the reinforcing bead 49 that is formed on the protruding portion 48, but differs from the recessed portion 62 in the first example embodiment in that it has a skirt shape in which a vertical width B2 thereof in the vehicle up and down direction increases toward the vehicle front side, and in that a front end portion of the recessed portion 76 is arranged partially overlapping with the first protruding portion 70. However, other embodiments are possible. For example, if the front-rear length of the first protruding portion is longer than the first protruding portion 70, a structure may also be employed in which a recessed portion that extends in the vehicle front-rear direction is formed in the middle portion in the vehicle up and down direction of the first protruding portion, similar to the first example embodiment.

This structure also follows the basic structure of the first example embodiment described above, so similar operation and effects as those obtained by the first example embodiment are able to be obtained. That is, in the vehicle frame structure according to this second example embodiment as well, the first edge line 42 and the second edge line 44 of the second protruding portion 40 are arranged substantially continuous in the vehicle front-rear direction with the third edge line 72 and the fourth edge line 74 of the first protruding portion 70, and the third edge line 72 and the fourth edge line 74 of the first protruding portion 70 are connected to the upper edge line 50 and the lower edge line 52. Therefore, with the vehicle front structure according to this example embodiment as well, the front side member 14 is able to efficiently bend toward the inner side of the vehicle in the vehicle width direction at a predetermined position when a collision occurs, without providing a weak portion that serves as a break starting point on the front side member 14, in a structure in which the second protruding portion 40 that protrudes from the outside surface of the crush box 26 outward in the vehicle width direction is formed on the outside surface of the crush box 26, similar to the first example embodiment described above.

Also, in this example embodiment, an end portion 70D of the first protruding portion 70 that is on the opposite side from the crush box 26 is arranged farther toward the front bumper reinforcement 12 side than the engine mount attaching portion 24, similar to the first example embodiment. Therefore, breaking and deforming of the front side member 14 toward the inner side of the vehicle in the vehicle width direction when a collision occurs will not be impeded by the engine mount attaching portion 24, so the front side member 14 is able to break and deform smoothly toward the inner side of the vehicle in the vehicle width direction when a collision occurs.

Moreover, in this example embodiment as well, the first protruding portion 70 is integrally formed with the front side member 14, similar to the first example embodiment, so a collision load is able to be transmitted more smoothly than it is when the first protruding portion 70 is formed separately from the front side member 14. Therefore, the front side member 14 is able to quickly break and deform at the connecting positions P2 and Q2 of the third edge line 72 and the fourth edge line 74 of the first protruding portion 70 when a collision occurs.

Also, in this example embodiment as well, the connecting position P2 of the first protruding portion 70 to the upper edge line 50 and the connecting position Q2 of the first protruding portion 70 to the lower edge line 52 are arranged in different positions in the vehicle front-rear direction, similar to the first example embodiment. Therefore, damageability when a low speed collision occurs is able to be improved, while the front side member 14 is able to efficiently break and deform toward the inner side of the vehicle in the vehicle width direction when a high speed collision occurs.

In the example embodiments described above, the vehicle frame structure of the disclosure is applied to the vehicle body front portion 10, but other embodiments are possible. For example, the vehicle frame structure of the disclosure may also be applied to a vehicle body rear portion. In this case, in a vehicle frame structure in which a crush box is arranged between a rear bumper reinforcement and a rear side member, a second protruding portion is formed on an outside surface in the vehicle width direction of the crush box, and a first protruding portion is formed on an outside surface in the vehicle width direction on a rear end side of the rear side bumper, and the connective relationships between a first edge line and a second edge line of the second protruding portion, and a third edge line and a fourth edge line of the first protruding portion, respectively, and the connective relationships between the third edge line and the fourth edge line, and an upper edge line and a lower edge line, respectively, need only be the same as they are in the first example embodiment.

Also, in the example embodiments described above, the connecting positions P1 and P2 of the first protruding portion 46 and 70 to the upper edge line 50 and the connecting positions Q1 and Q2 of the first protruding portion 46 and 70 to the lower edge line 52 are arranged in different positions in the vehicle front-rear direction, but other embodiments are possible. For example, these may both be arranged in the same position in the vehicle front-rear direction. In this case as well, a third edge line of a first protruding portion remains connected to an upper edge line, and a fourth edge line remains connected to a lower edge line, so the object of the disclosure is still achieved. That is, in this case as well, in a structure in which a second protruding portion that protrudes from an outside surface of a crush box outward in the vehicle width direction is formed on an outside surface of a crush box, a weak portion that serves as a break starting point is not formed on the front side member, so the front side member is able to efficiently bend toward the inner side of the vehicle in the vehicle width direction at a predetermined position when a collision occurs.

Furthermore, in the example embodiments described above, the first protruding portion 46 and 70 is integrally formed on the front side member 14, but other embodiments are possible. For example, a first protruding portion may also be formed separately from a front side member, and the separate first protruding portion may be attached to an outside surface in the vehicle width direction of the front side member by welding or the like.

Also, in the example embodiments described above, the crush box 26 having a flat cross-sectional structure is interposed between the front bumper reinforcement 12 and the front side member 14. However, if the structure is one in which the crush box 26 deforms before the front side member 14 does, and is able to transmit a load to the first protruding portion 46 and 70, the shape of the crush box 26 is not limited to a flat cross-sectional structure. For example, the shape of the crush box 26 may also be a cross-sectional structure with an open portion.

What is claimed is:

1. A vehicle frame structure comprising:
a bumper reinforcement that is arranged on an end of a vehicle body in a vehicle front-rear direction and extends in a vehicle width direction;
a side structure that extends from an end of the bumper reinforcement in the vehicle width direction toward a center of the vehicle body in the vehicle front-rear direction, the side structure including a closed cross-sectional structure, and including a first side wall,
the first side wall being provided on an outer side of the side structure in the vehicle width direction and including an upper edge line that extends in the vehicle front-rear direction, a lower edge line that extends in the vehicle front-rear direction, and a first protruding structure that protrudes outward in the vehicle width direction from the first side wall and extends in the vehicle front-rear direction; and a crush box that is arranged between the bumper reinforcement and the side structure, the crush box being deformable by a collision input equal to or greater than a predetermined value from the bumper reinforcement, the crush box including a second side wall that is positioned on an outer side of the crush box in the vehicle width direction, the second side wall including a second protruding structure that protrudes outward in the vehicle width direction from the second side wall and extends in the vehicle front-rear direction, the second protruding structure being provided on a middle structure, in a height direction, of the second side wall, wherein an edge line of the first protruding structure and an edge line of the second protruding structure are provided to be substantially continuous with each other in the vehicle front-rear direction;

a distance between the first protruding structure and the upper edge line at an end of the first protruding structure on the crush box side is greater than a distance between the first protruding structure and the upper edge line, at a position a predetermined first distance away from the end of the first protruding structure on the crush box side in a direction away from the crush box; and a distance between the first protruding structure and the lower edge line at the end of the first protruding structure on the crush box side is greater than a distance between the first protruding structure and the lower edge line, at a position a predetermined second distance away from the end of the first protruding structure on the crush box side in the direction away from the crush box.

2. The vehicle frame structure according to claim 1, wherein an end of the first protruding structure that is on an opposite side from the crush box is connected to the upper edge line and the lower edge line.

3. The vehicle frame structure according to claim 2, wherein a width in a vehicle up and down direction of the first protruding structure becomes wider farther away from the second protruding structure, in the vehicle front-rear direction.

4. The vehicle frame structure according to claim 1, wherein the crush box includes a closed cross-sectional structure, and is deformable in compressive deformation.

5. The vehicle frame structure according to claim 2, wherein the first side wall includes a recessed structure that is provided on a middle structure of the first protruding structure in a vehicle up and down direction, the recessed structure is recessed toward an inner side of the vehicle in the vehicle width direction and extends in the vehicle front-rear direction, and a width in the vehicle up and down direction of the recessed structure becomes narrower closer toward the crush box.

6. The vehicle frame structure according to claim 2, wherein the side structure includes an engine mount attaching structure at a predetermined position in the vehicle front-rear direction, and the end of the first protruding structure that is on the opposite side from the crush box is closer to the bumper reinforcement than the engine mount attaching structure is.

7. The vehicle frame structure according to claim 2, wherein the first protruding structure is integrally formed with the side structure.

8. The vehicle frame structure according to claim 2, wherein a connecting position of the first protruding structure to the upper edge line and a connecting position of the first protruding structure to the lower edge line are arranged in different positions in the vehicle front-rear direction.

* * * * *